(«12») United States Patent
Nam et al.

(10) Patent No.: US 11,001,318 B2
(45) Date of Patent: May 11, 2021

(54) RUBBER TRACK

(71) Applicant: DRB INDUSTRIAL CO., LTD., Busan (KR)

(72) Inventors: Yoon-Tae Nam, Busan (KR); Jung-Ho Park, Busan (KR)

(73) Assignee: DRB INDUSTRIAL CO., LTD., Busan (KR)

( * ) Notice: Subject to any disclaimer, the term of this patent is extended or adjusted under 35 U.S.C. 154(b) by 475 days.

(21) Appl. No.: 15/743,344

(22) PCT Filed: Jul. 11, 2016

(86) PCT No.: PCT/KR2016/007471
§ 371 (c)(1),
(2) Date: Jan. 10, 2018

(87) PCT Pub. No.: WO2017/010756
PCT Pub. Date: Jan. 19, 2017

(65) Prior Publication Data
US 2018/0201335 A1    Jul. 19, 2018

(30) Foreign Application Priority Data

Jul. 16, 2015 (KR) ........................ 10-2015-0101165

(51) Int. Cl.
*B62D 55/24* (2006.01)
*B62D 55/26* (2006.01)

(52) U.S. Cl.
CPC ........... *B62D 55/244* (2013.01); *B62D 55/24* (2013.01); *B62D 55/26* (2013.01)

(58) Field of Classification Search
CPC .... B62D 55/253; B62D 55/244; B62D 55/24; B62D 55/26
See application file for complete search history.

(56) References Cited

U.S. PATENT DOCUMENTS

| 2,402,042 | A | * | 6/1946 | Haushalter | ........... | B62D 55/211 305/158 |
| 3,387,897 | A | * | 6/1968 | Reid | ...................... | B62D 55/24 305/41 |
| 3,815,817 | A | * | 6/1974 | Bamford | ................ | B62D 55/24 238/10 R |

(Continued)

FOREIGN PATENT DOCUMENTS

KR    2007-0010559 A    1/2007

OTHER PUBLICATIONS

International Search Report for PCT/KR2016/007471, dated Oct. 14, 2016.

*Primary Examiner* — Scott A Browne
(74) *Attorney, Agent, or Firm* — Sughrue Mion, PLLC

(57) ABSTRACT

A rubber track to prevent occurrence edge-cuts and improve traction force even in the soft ground is disclosed. The rubber track is configured by first lugs which are formed at equal intervals on one side of the inside and the outside in a traveling direction on a surface coming into contact with the ground and have first grooves formed in a width direction; and second lugs which are formed at equal intervals on the other side of the inside and the outside in a traveling direction on a surface coming into contact with the ground and have second grooves formed in the traveling direction.

3 Claims, 3 Drawing Sheets

(56) References Cited

U.S. PATENT DOCUMENTS

| | | | | |
|---|---|---|---|---|
| 4,694,556 | A * | 9/1987 | Hewitt | B62D 55/28 |
| | | | | 29/451 |
| 6,290,009 | B1 * | 9/2001 | Kondo | B62D 55/253 |
| | | | | 180/89.1 |
| 6,505,896 | B1 | 1/2003 | Boivin et al. | |
| 6,520,603 | B2 * | 2/2003 | Shimada | B62D 55/253 |
| | | | | 305/167 |
| 7,014,279 | B2 * | 3/2006 | Watanabe | B62D 55/244 |
| | | | | 305/179 |
| 7,524,001 | B2 * | 4/2009 | Tsuru | B62D 55/21 |
| | | | | 305/171 |
| 7,866,767 | B2 | 1/2011 | Lemaire et al. | |
| 2006/0125318 | A1 | 6/2006 | Soucy et al. | |
| 2006/0163944 | A1 * | 7/2006 | Tsuru | B62D 55/21 |
| | | | | 305/165 |
| 2009/0195061 | A1 | 8/2009 | Bellemare | |
| 2016/0001830 | A1 * | 1/2016 | Matsuo | B62D 55/253 |
| | | | | 305/170 |

* cited by examiner

RUBBER TRACK

CROSS REFERENCE TO RELATED APPLICATIONS

This application is a National Stage of International Application No. PCT/KR2016/007471 filed Jul. 11, 2016, claiming priority based on Korean Patent Application No. 10-2015-0101165 filed Jul. 16, 2015, the contents of all of which are incorporated herein by reference in their entirety.

TECHNICAL FIELD

The present invention relates to a rubber track and more specifically, to a rubber track which is used for an excavator or a track loader, sufficiently secures traction force and extraction performance, and has a structure capable of preventing exposure of a steel cord, an edge-cut occurring at the outside, and the like.

BACKGROUND ART

A rubber track may be widely used for equipment such as a track loader as well as heavy equipment such as an excavator and has various types of lugs for securing traction force on the surface contacting the ground. For example, according to Korean Patent Registration Nos. 10-0725022 and 10-0638885, various types of lugs in a width direction for improving traction force during traveling are proposed.

Such a rubber track may require various functions in order to secure a traveling property of an excavator, a loader, and the like. For example, traction force that enables smooth traveling at the most basic level is required, and the traction force may be particularly a more important function in the poor ground. In addition, like the traction force, the extraction performance is required, and it can be said that traveling and rotation are simultaneously related to each other, and besides, it is natural that stability is required even during rotation.

In addition to the functions required during traveling, considering the sequentially repetitive motion of the trajectory, it is natural that the bending property capable of sufficiently flexibly bending with respect to a certain radius of curvature needs to be ensured. In addition, it is natural that the internal steel cord needs to be supported without being exposed by the use for a long period of time, and it is preferable that the steel cord has a structure which can prevent the occurrence of edge-cuts that may be caused by traveling.

DISCLOSURE

Technical Problem

In order to solve the above problems, an object of the present invention is to provide a rubber track capable of securing traveling, rotation force, and extraction performance by arranging lugs having different structures on both sides of the surface in contact with the ground.

Another object of the present invention is to provide a rubber track capable of securing sufficient traction force even in the soft ground.

Yet another object of the present invention is to provide a rubber track having a structure capable of preventing an internal steel cord from being exposed.

Still another object of the present invention is to provide a rubber track capable of preventing edge-cuts from occurring at the outside of the rubber track.

Still yet another object of the present invention is to provide a rubber track capable of autonomously removing foreign substances deposited on the inner surface by traveling.

In addition, in the following description of the present invention, such objects can be fully understood and other visual effects and the like can be understood.

Technical Solution

In order to achieve the above-mentioned objects, the present invention provides a rubber track including: first lugs which are formed at equal intervals on one side of the inside and the outside in a traveling direction on a surface coming into contact with the ground and have first grooves formed in a width direction; and second lugs which are formed at equal intervals on the other side of the inside and the outside in a traveling direction on a surface coming into contact with the ground and have second grooves formed in the traveling direction.

In a preferred embodiment, side protrusions formed to protrude from the surface to the back surface through the side may be provided at the outsides of the first lug and the second lug.

In another preferred embodiment, auxiliary lugs extending in a width direction may be provided between the first lug and the second lug.

In yet another preferred embodiment, the first groove may be formed to have a closed outside of the rubber track.

In still another preferred embodiment, the first lugs and the second lugs may be alternately formed in the traveling direction.

In still yet another preferred embodiment, the side protrusion may be bisected in a fork shape on the back surface.

In still yet another preferred embodiment, inclined stepped portions may be formed at both sides of the back surface of the rubber track.

Advantageous Effects

According to the present invention having the above configurations, the first lug and the second lug formed on the surfaces coming into contact with the ground in the rubber track have different functions, thereby having excellent extraction performance in a traveling direction and a function of preventing a slip in a side direction at the same time while securing traction force and securing flexibility in which the rubber track is easily bent.

In addition, the side protrusion is configured to protrude from the surface to a part of the back surface while surrounding the side. It may be expected that the side protrusion may have advantages of providing traction force even in the soft ground and preventing occurrence of edge-cuts that may occur at the outside of the main lugs at the same time. In addition, such a side protrusion may substantially refer to a portion which is most conspicuously exposed at the outside while traveling. Since the side protrusion of the present invention is formed to entirely surround the surface and the back surface, it is expected that traction force and grounding force are visually excellent.

According to the auxiliary lugs of the present invention, it is possible to prevent exposure of a steel cord between the lugs while having an auxiliary function capable of improving entirely traction force even in the soft ground. It is determined that such as auxiliary lug is formed to extend from the central portion to the outside to help to prevent occurrence of the edge-cuts.

According to the configuration of the inclined stepped portions formed at both sides of the back surface of the rubber track of the present invention, force based on the deformation of the rubber track when bending is applied to the foreign materials deposited in a traveling process or the like to separate and remove the foreign materials themselves. Other additional effects of the present invention and the like will be described in more detail through exemplary embodiments to be described below.

MODES OF THE INVENTION

Figure 1:
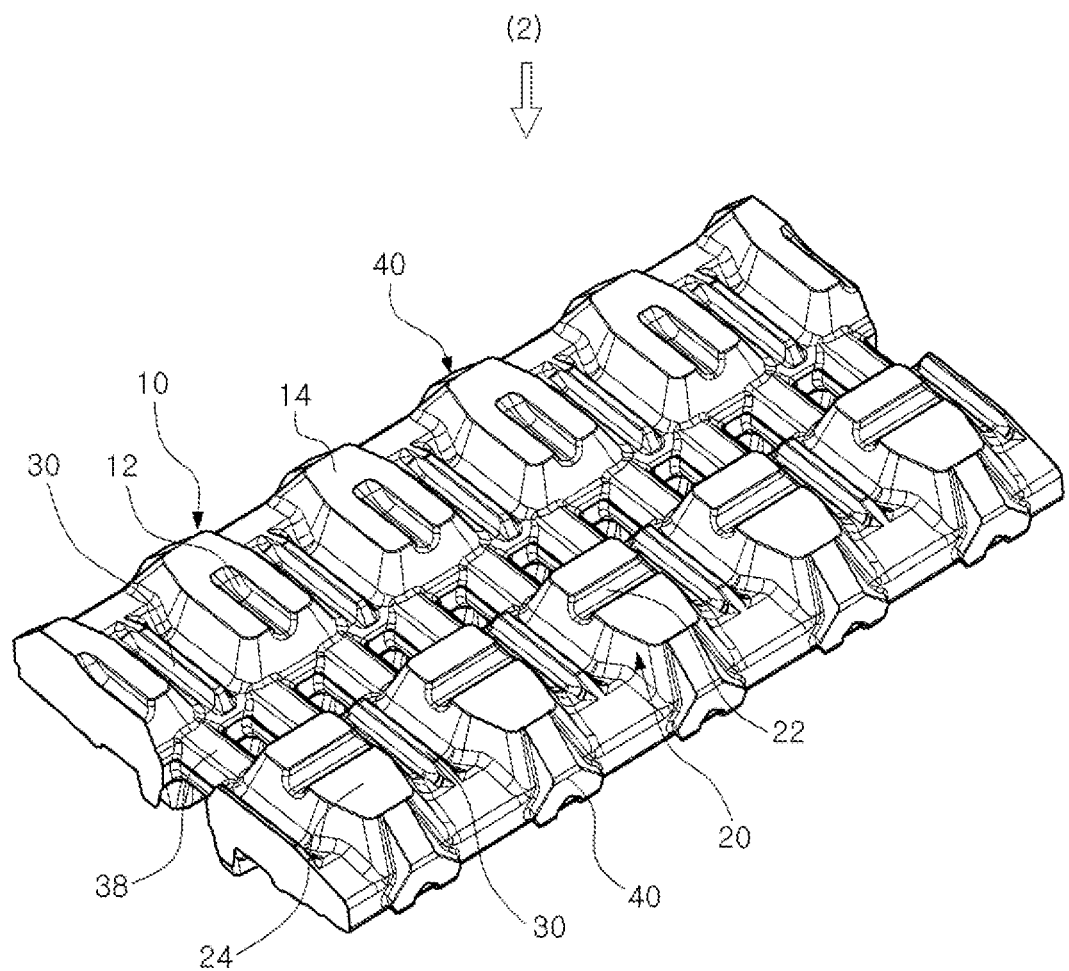
FIG. 1 is a perspective view showing a surface of a rubber track according to the present invention.

Hereinafter, the present invention will be described on the basis of exemplary embodiments illustrated in the drawings. As illustrated in FIG. 1 showing the surface of the rubber track of the present invention, on a surface of a rubber track, a first lug 10 and a second lug 20 are arranged at the inside and the outside in a line, respectively.

In the present specification, the "surface 2" refers to a surface of the rubber track coming into contact with the ground and the "back surface 4" refers to a surface which does not come into contact with the ground, that is, an opposite surface of the surface 2. In addition, the "outside" of the rubber track refers to an outer portion in a pair of rubber tracks installed in a device and the "inside" is defined as meaning the inner portion which is close to the pair of rubber tracks.

In the surface 2 of the rubber track of the present invention, a main lug formed to basically exhibit traction force may be the first lug 10 and the second lug 20. In addition, the first lug 10 and the second lug 20 have substantially different shapes. The first lug 10 has first grooves 12 formed in a width direction and the second lug 20 has a second grooves 22 formed in a traveling direction.

As such, by forming the first lug 10 and the second lug 20, which have different structures at the inside and the outside, respectively, the functions of the respective lugs 10 and 20 may be independently exhibited. First, the first lug 10 is formed to have the first groove 12 in the width direction of the rubber track to secure basic traction force. In addition, when the first grooves 12 are formed in the width direction and bent in an arc form on the track, it is expected that the rubber track will be advantageous to be flexibly deformed to have a specific radius of curvature. In the present specification, it is assumed that the function has flexibility that the rubber track may be flexibly bent.

Figure 3:
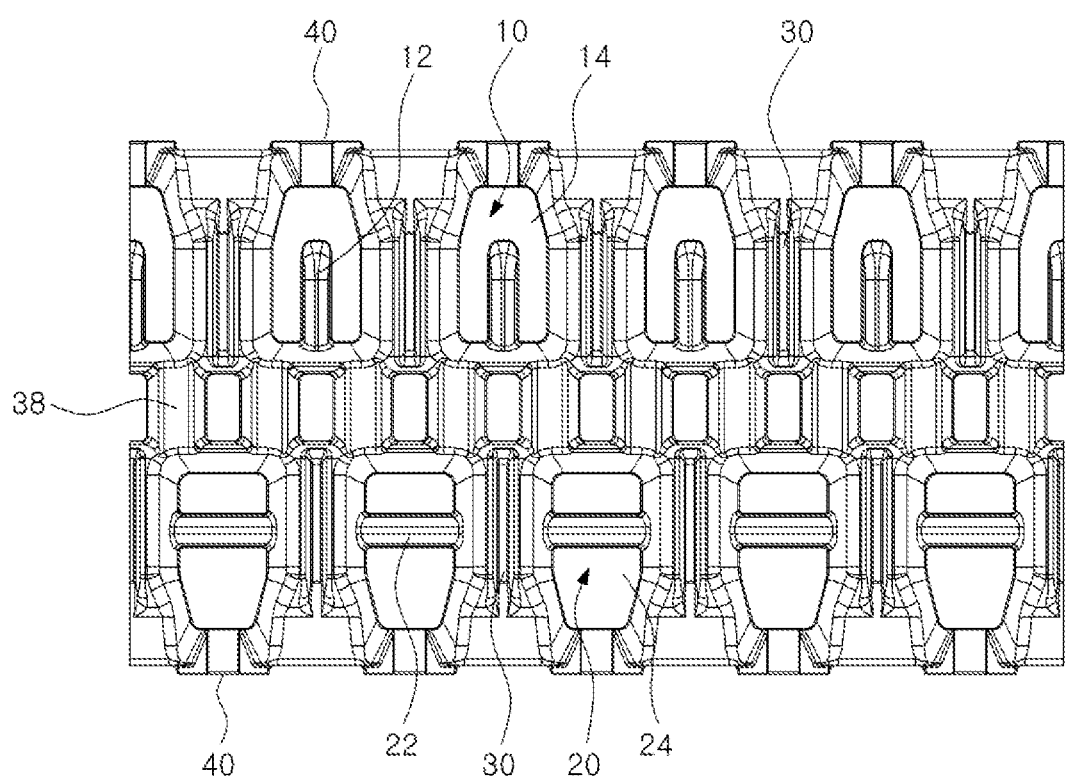
FIG. 3 is a plan view showing a surface of the rubber track according to the present invention.

The first lug 10 and the second lug 20 are asymmetrically rather than symmetrically formed as seen more clearly in FIG. 3. Herein, it can be understood that the fact that the first lug 10 and the second lug 20 are asymmetrically formed means that the first lug 10 and the second lug 20 are alternately arranged based on an engaging portion 38 or alternately arranged in a traveling direction, as illustrated in the drawing.

In addition, it can be seen that the first groove 12 of the first lug 10 is in a state where the outside is closed, that is, for example, the first lug 10 has a U shape because the outside is closed. As such, when the first groove 12 is formed so that the outside is closed, it may be natural that the surface area of the lug 10 may be substantially further secured. In addition, as such, through the first lug 10 having the first groove 12 with the closed outside, it is expected to provide stability in rotation or an inclined area of equipment (such as an excavator).

As described above, in the second lug 20 formed at the other side of the first lug 10, the second grooves 22 are formed in the traveling direction. Herein, the inner and outer positions of the first lug 10 and the second lug 20 are selected, and for example, when the first lug 10 is formed at the inside of the rubber track, the second lug 20 is formed at the outside, and when the first lug 10 is formed at the outside the rubber track, the second lug 20 is formed at the inside. Since the second grooves 22 are formed in the traveling direction in the second lug 20, the second grooves 22 may be firmly supported against the centrifugal force during rotation and may be prevented from slipping from the slope to the side at the same time.

The reason why the second lug 20 may prevent a side slip phenomenon that may occur in the slope is that the second grooves 22 are formed to have sufficient lengths in the traveling direction and formed in a state where the front and rear sides of the groove 22 are opened. It should be understood that extraction performance is excellent and sufficient side support force may be secured at the same time by the structure of the second groove 22.

As described above, the first lug 10 and the second lug 20 may be substantially the main lugs, and a size of contact surfaces 14 and 24 where these main lugs come into contact with the ground during traveling may be determined by calculating an area required for traveling and the like. In addition, the main lugs 10 and 20 are repetitively arranged at regular intervals in the traveling direction and a plurality of auxiliary lugs 30 is formed between the first lug 10 and the second lug 20, respectively. These auxiliary lugs 30 are formed in the width direction and formed to be lower and smaller than the first lug 10 or the second lug 20 in height and size, but has the following functions.

The auxiliary lugs 30 may perform a function of assisting the traction force in the soft ground. Although the auxiliary lug 30 is formed lower than the first lug 10 and the second lug 20 described above in height, the auxiliary lug 30 may have a function as an auxiliary means capable of exhibiting the traction force while the rubber track no longer falls out in the soft ground such as wetlands.

In addition, the auxiliary lug 30 is substantially formed at a concave portion between the first lug 10 and the second lug 20. In addition, like the main lugs 10 and 20, the auxiliary lugs 30 are formed to extend outwardly of the engaging portion 38, which receive a sprocket from the rubber track and transmit the power to the rubber track. The auxiliary lug 30 also has a function of preventing the steel cord embedded in the rubber track from being exposed between the main lugs 10 and 20.

Further, the auxiliary lug 30 is formed to extend inward and outward based on the engaging portion 38, and the auxiliary lug 30 may substantially have a function of connecting the central portion and the outer portion of the rubber track. As a result, the auxiliary lug 30 may help to prevent the occurrence of an edge-cut that may occur at the edge portion of the rubber track as much as possible.

Figure 2:
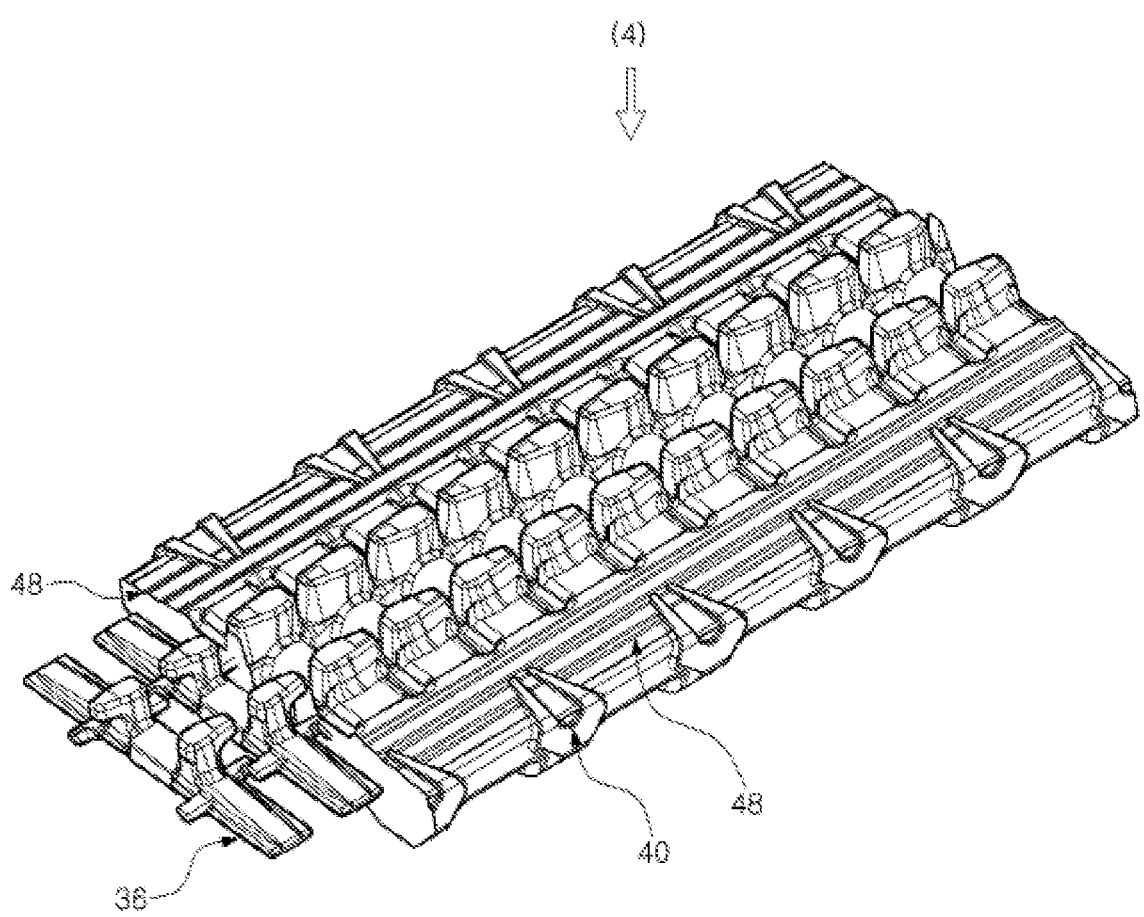
FIG. 2 is a perspective view showing a back surface of the rubber track according to the present invention.

In addition, according to the present invention, a side protrusion 40 is formed to surround the side surfaces of the first lug 10 and the second lug 20. The side protrusion 40 passes through the side surfaces from the surface 2 of the first lug 10 and the second lug 20 and then extends to the back surface 4 of the rubber track as illustrated in FIG. 2. Accordingly, it can be seen that the side protrusion 40 is formed by surrounding the surface 2 and the back surface 4 of the rubber track, and by such a configuration, substantially, it possible to prevent the occurrence of the edge-cut that may occur at the outside of the end portion of a metal core 36.

Such as side protrusion 40 has also a function of exhibiting sufficient traction force in the soft ground. That is, when the rubber track somewhat falls out of the soft ground, the side protrusion 40 located on the side of the rubber track may exhibit traction force for traveling, and it may refer to a function based on the structure which substantially protrudes while surrounding the entire side surface of the rubber track.

Referring to FIG. 2, as described above, it can b seen that the side protrusion 40 protrudes while surrounding the entire side surface of the rubber track. In addition, in the back surface 4 of the rubber track, it can be seen that the end portion of the side protrusion 40 is bisected. As such, it is expected that stress concentration may be prevented by dispersing the load applied to the side protrusion 40 during traveling by forming the end of the back surface 4 of the side protrusion 40 which has a bisected fork shape.

In addition, on the back surface 4 of the rubber track of the present invention, it can be seen that stepped portions 48 having continuous steps like stairs are formed on both sides. It can be seen that the stepped portions are formed so as to have an inclination toward the outer side. The inclined stepped portions 48 may be used to remove foreign materials that may be deposited by traveling to the outside, and may have a self-cleaning function in a sense.

By the traveling of the traveling device, the foreign materials are deposited on the back surface 4 of the rubber track. Herein, when the rubber track is bent in an arc shape while entering the front or rear side of the rubber track, the foreign materials deposited inside the stepped portion 48 is subjected to predetermined external force due to deformation of the bent stepped portion 48, and such external force will act as force to drop the foreign materials from the back surface 4 of the rubber track to the outside.

Due to the structure of the stepped portion 48 itself and the inclined structure, the foreign materials deposited in the stepped portion is different in thickness. The foreign materials deposited in such different thickness may be more easily detached by the external force received in the process in which the stepped portion 48 of the rubber track is bent in the arc shape. Herein, it is natural that the end of the side protrusion 40 bisected in the fork shape while extending to the back surface 4 of the rubber track may apply the external force to the foreign materials so that the foreign materials may be easily detached in cooperation with the stepped portion 40 in the process of bending the rubber track.

It is expected that a structure in which mountains and valleys are repeated instead of the structure of the stepped portion 48 may have the same function and action effect. In addition, even in such a case, it is preferable to form the rubber track so as to have a somewhat reduced thickness toward both side edges of the rubber track.

It will be apparent to those skilled in the art that various modifications are possible within the technical scope of the present invention as described above. In addition, the scope of the present invention should be interpreted based on the scope of the appended claims.

The invention claimed is:

1. A rubber track, comprising:
   a lug formed on an outer surface of the rubber track coming into contact with the ground and configured to increase traction force of the rubber track;
   a side protrusion connected to the lug on the outer surface and extending to an inner surface of the rubber track such that the side protrusion covers the side of the rubber track; and
   an inclined stepped portion formed on the inner surface of the rubber track to be inclined toward a side of the rubber track,
   wherein the rubber track has a certain radius of curvature,
   wherein the inclined stepped portion is bent such that external force is applied to foreign substances to be separated from the inner surface of the rubber track, when the rubber track is bent, and
   wherein a bottom surface of a fork-shaped end portion of the side protrusion extends along the inner surface towards a center of the rubber track.

2. The rubber track of claim 1, wherein the inclined stepped portion is connected to the side protrusion.

3. A rubber track comprising:
   a lug formed on an outer surface of the rubber track coming into contact with the ground and configured to increase traction force of the rubber track; and
   a side protrusion connected to the lug on the outer surface and extending to an inner surface of the rubber track such that the side protrusion covers a side of the rubber track,
   wherein a bottom surface of a fork-shaped end portion of the side protrusion extends along the inner surface towards a center of the rubber track.

* * * * *